United States Patent [19]
Dean

[11] Patent Number: 6,003,094
[45] Date of Patent: Dec. 14, 1999

[54] GENERIC JAVA GATEWAY FOR CONNECTING A CLIENT TO A TRANSACTION PROCESSING SYSTEM

[75] Inventor: Andrew Robert Dean, Hedge End, United Kingdom

[73] Assignee: International Business Machines Corporation, Armonk, N.Y.

[21] Appl. No.: 08/947,597

[22] Filed: Oct. 9, 1997

[51] Int. Cl.$^6$ ................................ G06F 9/44; G06F 13/00
[52] U.S. Cl. ........................ 709/303; 709/305; 395/705
[58] Field of Search ................................ 709/201, 202, 709/203, 205, 217, 219, 300, 303, 304, 305; 707/10, 103; 395/702, 705, 707, 710

[56] References Cited

U.S. PATENT DOCUMENTS

| | | | |
|---|---|---|---|
| 5,379,426 | 1/1995 | Foss et al. | 395/683 |
| 5,706,434 | 1/1998 | Kremen et al. | 395/200.48 |
| 5,745,703 | 4/1998 | Cejtin et al. | 395/200.68 |
| 5,754,830 | 5/1998 | Butts et al. | 395/527 |
| 5,860,072 | 1/1999 | Schofield | 707/101 |
| 5,872,973 | 2/1999 | Mitchell et al. | 395/685 |
| 5,875,335 | 2/1999 | Beard | 395/705 |

OTHER PUBLICATIONS

Phil Inje Chang, 'Inside the Java Web Server', Aug. 1997, http://java.sun.com/features/1997/aug/jws1.html.

Fred Tibbitts, 'CORBA: A Common touch for Distributed Applications', May 1995, http://www.data.com/Tutorials/CORBA.html.

*Primary Examiner*—Viet D. Vu
*Attorney, Agent, or Firm*—Edward H. Duffield

[57] ABSTRACT

A data processing method for a workstation is disclosed. The workstation is responsive to a message received from another workstation, the message comprising a request of a type including: (a) a first part containing data indicative of requests of the request type; and (b) a second part containing request data. The workstation executes the following steps: reading the first part of the request to ascertain the request type; dynamically creating an object associated with the request type; calling the dynamically created object to execute the request; and calling the dynamically created object to return any result of the request to the other workstation.

10 Claims, 3 Drawing Sheets

GENERIC JAVA GATEWAY FOR CONNECTING A CLIENT TO A TRANSACTION PROCESSING SYSTEM

FIELD OF THE INVENTION

The present invention relates to the field of data processing.

BACKGROUND OF THE INVENTION

FIG. 1 shows a network computer 10 running, inter alia, Java enabled browser software 11. The software 11 communicates with web servers across the Internet to download information using HTTP (hypertext transfer protocol). More and more frequently, users are conducting commercial transactions across the Internet. In FIG. 1, a user running the software 11 needs to conduct transactions via the Internet through, for example, an IBM CICS (trademark of IBM) transaction processing system. A CICS system comprises a server 12, and a plurality of client workstations 14, only one shown. The client workstation runs CICS client software 16 for communicating with the server 12 across a link using EPI (External Presentation Interface) or ECI (External Call Interface) requests and replies. It is also possible for a CICS client workstation 14 to act as a Web server, using appropriate software 18 supporting HTTP. This allows one or more network computers to connect to the workstation 14 across the Internet to download information defining, for example, front screen displays for inputting and receiving transaction information, as well as indictors for any Java programs (applets).

The need to interface between Java programs running in a remote location, for example, the Internet Web browser 11, to existing or new applications running in a second location, for example a transaction processing system 12/16, results in the need for a Java Gateway 20 to bridge between the two locations.

This Gateway could be, and normally is, specifically designed to support the particular semantics of the second location application with hard coded messages and message specific code in the Gateway.

However, such a solution is inflexible since it is not easy to expand the supported interfaces/applications without having to rebuild and update the Gateway to understand them. Also it results in each application in the second location having its own Gateway implementation, rather than all applications using a single Gateway.

SUMMARY OF THE INVENTION

Accordingly, the present invention provides a data processing method executed on a first workstation, said first workstation being responsive to a message received from a second workstation, said message comprising a request of a type including:

(a) a first part containing data indicative of requests of said request type; and (b) a second part containing data specific to the request; said method comprising the following steps:

reading the first part of the request to ascertain the request type;

dynamically creating an object associated with said request type;

calling the dynamically created object to execute said request using said request data; and calling the dynamically created object to return any result of the request to the second workstation.

The present embodiment uses dynamic naming object creation mechanisms of the Java Virtual Machine, to implement a generic Java Gateway on a workstation. This Gateway is thus 'blind' to the requests that it is passing on, and can be expanded to support a new type of interface/application by simply placing a new Java class where it can be found by the Java class-loading mechanism in the file system. There is no need to rebuild, reconfigure or even stop the Gateway to add support for a new request type. By using a generic Gateway it is possible to have a single Gateway which handles requests for many different applications.

BRIEF DESCRIPTION OF THE DRAWINGS

An embodiment of the invention will now be described with reference to the accompanying drawings, in which.

DESCRIPTION OF THE PREFERRED EMBODIMENT

Figure 1:
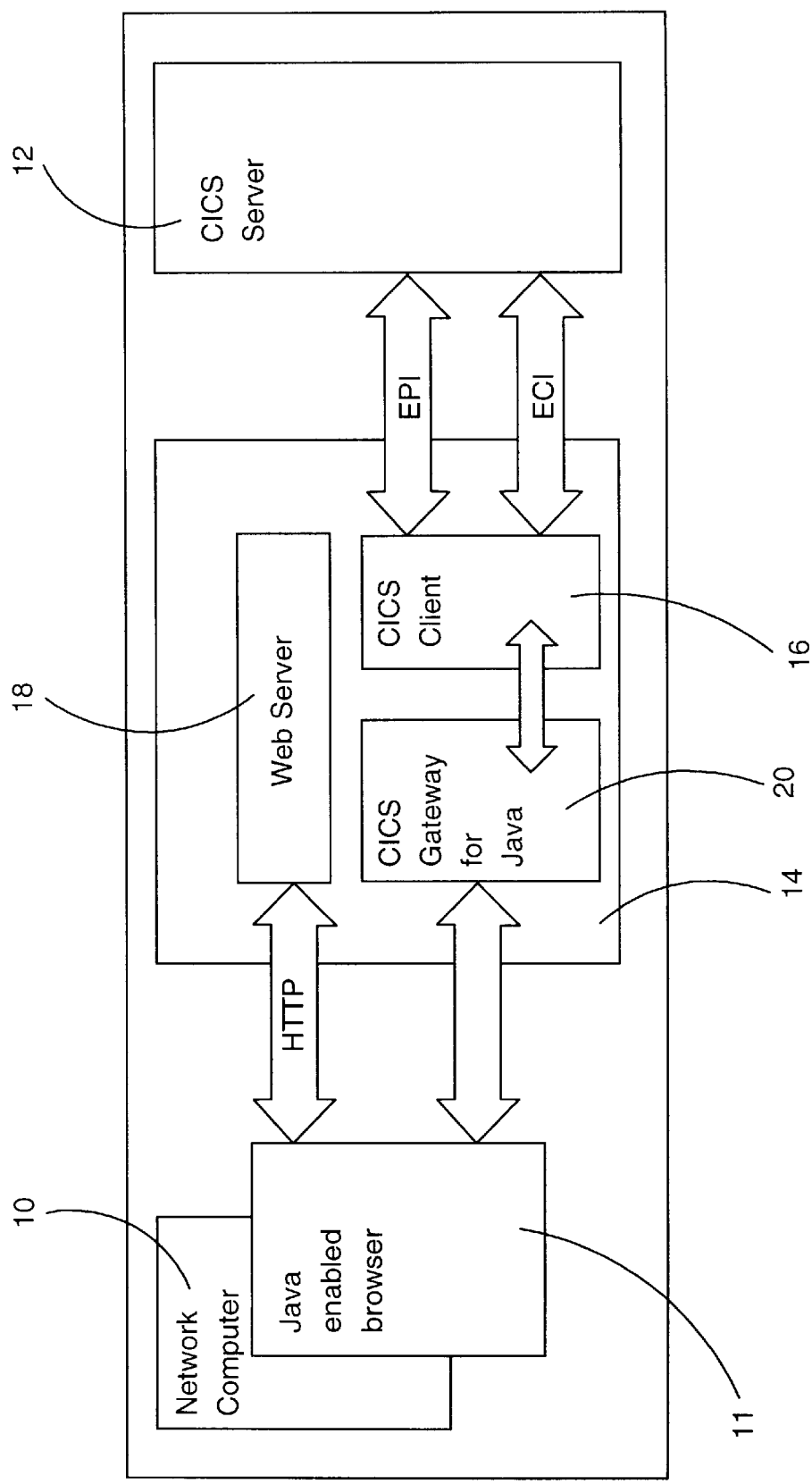
FIG. 1 is a block diagram including a client and a gateway for performing a data processing method according to the invention.

The present embodiment will be described with reference to an airline ticket booking system, where a client workstation 10 runs front end booking software through a Java enabled browser 11 in order to complete transactions on a transaction processing system 12/16. An instantiation of a client class, called BookTktReq, which we will refer to as the client object runs on the workstation 10. The client object gathers any required input data such as a flight number, credit card number and passenger name, before transmitting a message containing this data to a gateway workstation 14. An instantiation of a gateway class, called BookTktRelay, which we will call the gateway object runs on the gateway 14. The gateway object takes this input data and relays the data to a CICS server 12 in a conventional manner and receives any output data, for example, confirmation that the flight has been booked. This output data is then transmitted by the gateway object back to the client. In this respect, the embodiment is conventional.

Once a logical connection is set up between the client and the gateway, the client can send request messages to the gateway. Messages comprise:

(a) a first part containing data indicative of requests of a given request type; and (b) a second part containing request data.

Figure 2:
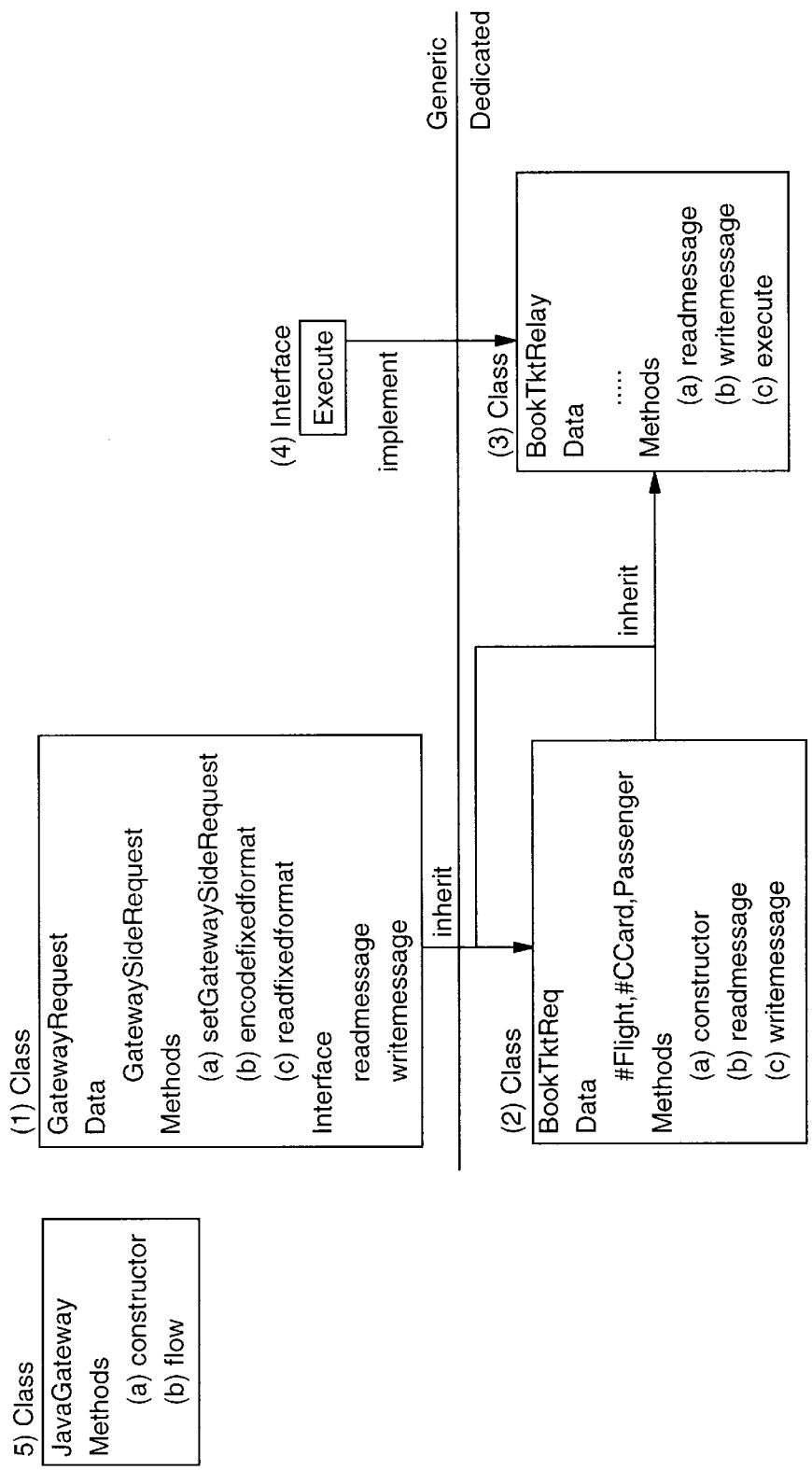
FIG. 2 is a block diagram of the components of the client and gateway.

The generic Java Gateway is based around an object model, consisting of some basic classes, and an interface, as shown in FIG. 2:

(1) GatewayRequest class—this is the root class from which all valid request classes should inherit. It contains the following data-members:

(a) a string ("GatewaySideRequest") which at run-time contains the name of a relevant Gateway side request class (see 3 below) for processing a request.

It also contains:

(a) a method ("setGatewaySideRequest") that a child-class (see 2 below) can call to set the Gateway side request class name;

(b) a method ("encodefixedformat") which an object can call to encode the first fixed format part of a message; and (c) a method ("readfixedformat") to read the contents from the first fixed format message.

The class also includes an interface defining readmessage and writemessage methods, which will be explained later.

(2) Client Side Request class—this is the class which provides the client-side interface for a particular request. In the present embodiment, this is called BookTktReq. The class should inherit (possibly indirectly) from the root GatewayRequest. It contains:

(a) Data-members for all the relevant data which makes up this request, in this example, flight number, credit card number and passenger name.

It also must provide:

(a) A constructor which calls the parent setGatewaySideRequest method to set the name of the partner Gateway-side request class for this request type;

(b) A method ("writemessage") to encode its data in a message format that its partner Gateway-side request class can read; and (c) A method ("readmessage") to read and set its data from a message written by its partner Gateway-side request class.

(3) Gateway Side Request class—this is the class which provides the code to execute a particular request. In the present embodiment, this is called BookTktRelay. The class normally inherits from its partner client-side Client Side Request class, so inheriting all the data-members that represent this type of request. However, the basic requirement is that it should inherit (possibly indirectly) from the root GatewayRequest. It must also implement an ExecuteRequest interface (see 4 below).

It must provide:

(a) A method ("readmessage") to read and set its data from the message written by its partner client-side request class. This "writemessage" method overrides that implemented in BookTktReq;

(b) A method ("writemessage") to encode its data in a message format that its partner client-side request class can read. Again, this "writemessage" method overrides that implemented in BookTktReq; and (c) A method that implements an ExecuteRequest interface.

(4) ExecuteRequest interface—this interface defines an "execute" method that is called by the Gateway to execute a request. The "execute" method carries out the actual work of the request, using its data-members to call a program on the remote CICS server, possibly by calling some legacy code, although this do not form part of the current disclosure.

(5) JavaGateway class—this class includes further methods required to maintain the logical client/server connection and to transmit and receive messages. It includes:

(a) A constructor for setting up and maintaining the connection. At the implementation level, this JavaGateway class often maintains a network connection back to the generic Java Gateway; and (b) A method ("flow") which sends a request message from the client and processes the response from the server.

Figure 3:
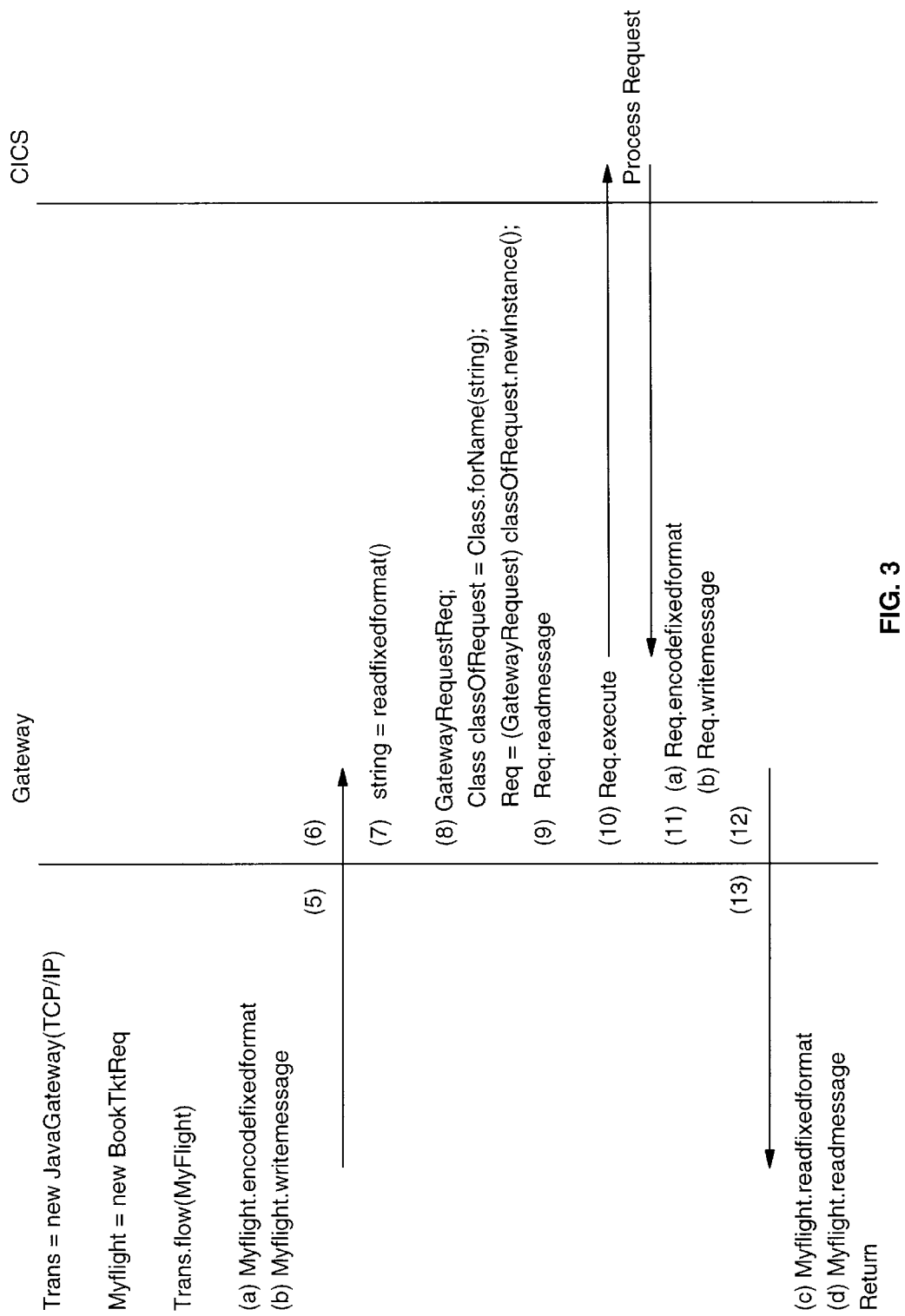
FIG. 3 is a diagram illustrating the data processing method according to the invention.

FIG. 3 illustrates the operation of the embodiment. Relevant pieces of source code are shown where necessary. The logic flow involved in executing a request via the Gateway is as follows:

(1) The client code instantiates a JavaGateway object to represent the connection to the generic Java Gateway. This is done by providing, inter alia, the Gateway's TCP/IP address.

(2) The client code instantiates a relevant client-side request object to represent the request that it wishes to make. In the example, the instantiation is built into the application, as can be seen from the reference to BookTktReq in the source code. As will be seen later, a generic client side application could be developed, where this instantiation is dynamic. This is not thought to be necessary though because, it is not thought likely that all transaction processing applications would adhere to the same data gathering and disseminating model.

As explained previously, the BookTktReq constructor calls setGatewaySideRequest to write the value "BookTktRelay" into the GatewaySideRequest data member.

(3) The client "flow"s the request to the generic Java Gateway by calling the "flow" method implemented by the JavaGateway object (4) The client-side JavaGateway object "flow" method creates a relevant message by:

(a) Calling the client-side request's parent GatewayRequest object, "encodefixedformat" to write its first fixed part of the message. encodefixedformat uses the value of GatewaySideRequest set at step (2) to fill in the first fixed format part of the message; and (b) Calling the client-side request's "writemessage" method to write its second request specific part of the message (5) The client-side JavaGateway object "flow" method sends the message to the generic Java Gateway (6) The generic Java Gateway receives the message (7) The Gateway reads the fixed (GatewaySideRequest) part of the message to ascertain what type of request it has received. readfixedformat essentially returns a string corresponding to the name of the gateway side request. In this case, the variable ("string") holding this string, contains the value BookTktRelay, set at step (2) above.

(8) The Gateway dynamically instantiates a Gateway-side object based on the object name contained within the fixed part of the message. The gateway application knows that the object must be a GatewayRequest type and so the line:

GatewayRequest Req;

is included. The code then takes the string variable set at step (7) above and says that this is a class with the line:

Class classOfRequest=Class.forName(string);

"Req" is then instantiated, essentially being a proxy name for BookTktRelay:

Req=(GatewayRequest) classOfRequest.newInstance( );

It can be seen that no mention of BookTktRelay is included in the source code which only needs to be able to locate the BookTktRelay class to operate.

(9) The Gateway then calls the dynamically instantiated object's "readmessage" method to ask it to read in the request specific data

(10) The Gateway calls the Gateway-side request's ExecuteRequest interface method to execute the request

(11) Once the request has been executed, the Gateway creates a relevant reply message by (a) Calling the Gateway-side request's parent GatewayRequest object, "encodefixedformat" to write its first fixed part of the message; and (b) Calling the Gateway-side request's "writeimessage" method to write its second request specific part of the message

(12) The Gateway sends the message to the client-side JavaGateway object

(13) The client-side JavaGateway object "flow" method receives the reply message

(14) The JavaGateway object "flow" method continues by (c) reading the fixed (GatewayRequest) part of the message (d) calling the original client-request object's "readmessage" method to read in the second request specific part of the reply message

(15) The JavaGateway object "flow" method returns; the original client-side request object now contains the results of the request In the above description, the generic Java Gateway is only aware of the format of the first fixed-part of the message, that is the part defined by the GatewayRequest class. The format of the second request specific part of the message is only known by a particular request type's client-side and partner gateway-side classes. Also the action of the "execute" method is unknown to the Gateway. As a result the generic Java Gateway is "blind" to the request that it is executing. Also, by using the dynamic named object capabilities of Java, any correctly formed request can be flowed between the client and Gateway as long as the relevant Gateway-side class can be found and created by the Gateway. This means that the Gateway does not need to have previously been configured to support a request type.

It can be seen therefore that many client workstations 10 can run any number of different applications and yet still connect to the same gateway 14, which relays on the different types of requests to, for example, one or more transaction processing systems 12/16 for processing.

While Java has been used in exemplifying the invention, it will be seen that the invention is applicable to any language in which objects or procedures can be dynamically created at run-time.

I claim:

1. A data processing method executed within a Java Virtual Machine operating on a first workstation, said first workstation being responsive to a message received from an applet running on a second workstation, said message comprising a request of a type including:

(a) a first part containing data indicative of requests of said request type; and (b) a second part containing data specific to the request; said method comprising the following steps:

reading the first part of the request to ascertain the request type;

dynamically creating an object associated with said request type using Java dynamic naming object creation mechanisms;

calling the dynamically created object to execute said request using said request data, said execution including the step of relaying the request data to a transaction processing system; and calling the dynamically created object to return any result of the request generated by said transaction processing system to the second workstation.

2. A data processing method as claimed in claim 1 including the step of:

calling said dynamically created object to read said request data.

3. A data processing method as claimed in claim 1 wherein said first workstation is a web server and said second workstation is a client.

4. A data processing method as claimed in claim 1 in which said transaction processing system comprises a transaction processing client running on said server, said client communicating with a transaction processing server remote from said server.

5. A data processing method as claimed in claim 1 wherein said first part includes the name of the request type.

6. A data processing method as claimed in claim 1, wherein said first workstation returns a result of a type including:

(a) a first part containing data indicative of results of said result type; and (b) a second part containing data specific to the result;

responsive to said first workstation returning a result, said second workstation executing the following steps:

reading the first part of the result to ascertain the result type; and calling an object associated with said result type to read said result data.

7. A computer product comprising computer readable program code stored on a computer readable recording medium, the program code when run within a Java Virtual Machine operating on a first workstation carries out a data processing method on the first workstation, said first workstation being responsive to a message received from an applet running on a second workstation, said message comprising a request of a type including:

(a) a first part containing data indicative of requests of said request type; and (b) a second part containing data specific to the request; said method comprising the following steps:

reading the first part of the request to ascertain the request type;

dynamically creating an object associated with said request type using Java dynamic naming object creation mechanism;

calling the dynamically created object to execute said request using said request data, said execution including the step of relaying the request data to a transaction processing system;; and calling the dynamically created object to return any result of the request generated by said transaction processing system to the second workstation.

8. A data processing method executed within a Java Virtual Machine operating on a first workstation, said first workstation sending a message to a second workstation being responsive to said message, said message comprising a request of a type including:

(a) a first part containing data indicative of requests of said request type; and (b) a second part containing data specific to the request; said method comprising the following steps:

setting the first part of the request to indicate the request type, so that the said second workstation can dynamically create an object associated with said request type using Java dynamic naming object creation mechanisms;

setting the second part request data, so that the second workstation can dynamically call the created object to execute said request using said request data, said execution including the step of relaying the request data to a transaction processing system, and call the dynamically created object to return any result of the request generated by said transaction processing system to the first workstation.

9. A data processing method according to claim 8 in which, said result is of a type including:

(a) a first part containing data indicative results of said result type; and (b) a second part containing data specific to the result; and said first workstation carries out the steps of:

responsive to said second workstation returning a result, reading the first part of the result to ascertain the result type; and calling an object associated with said result type to read said result data.

10. A computer system including a processor, a memory, a Java Virtual Machine adapted to be loaded into said memory and a storage medium, said system including a computer program product comprising computer readable program code stored on said storage medium, the system being adapted to load said program code into said Java Virtual Machine, said processor being adapted to execute said program code to carry out a data processing method, said system being responsive to a message received from a remote workstation, said message comprising a request of a type including:

(a) a first part containing data indicative of requests of said request type; and (b) a second part containing data specific to the request; said method comprising the following steps:

reading the first part of the request to ascertain the request type;

dynamically creating an object associated with said request type using Java dynamic naming object creation mechanisms;

calling the dynamically created object to execute said request using said request data, said execution including the step of relaying the request data to a transaction processing system; and calling the dynamically created object to return any result of the request generated by said transaction processing system to the remote workstation.

\* \* \* \* \*